United States Patent Office 3,715,217
Patented Feb. 6, 1973

3,715,217
METHOD OF MAKING FREE-FLOWING FLAVOR-ING POWDERS OF HIGH FLAVOR-CONCENTRATION AND PRODUCTS THEREOF
Edward W. Rosenbaum, Rydal, and Kurt L. Schoen, Philadelphia, Pa., assignors to David Michael & Co., Philadelphia, Pa.
No Drawing. Filed Aug. 15, 1967, Ser. No. 660,607
Int. Cl. A23l 1/26
U.S. Cl. 99—140 R                 4 Claims

ABSTRACT OF THE DISCLOSURE

The method of making a dry, free-flowing flavoring powder (as, for instance, a vanilla powder having a flavor-concentration substantially higher than that of heretofore conventional sugar-base flavoring powders which comprises intermixing with a dry free-flowing micro-crystalline cellulose alone or with an admixture thereof with sugar and/or starch, such an amount of a concentrated flavoring liquid in relation to the amount of the micro-crystalline cellulose that the flavoring constituents contained in the amount of flavoring liquid so used will be substantially greater (of the order twice as much or more) than the flavoring constituents which can be admixed with sugar alone in the production of a conventional sugar-base dry free-flowing flavoring powder, thereafter drying such admixture by passing heated air thereover until the resultant product is friable and pulverizable, and thereafter crushing and pulverizing the resultant friable mass. The resulting dry free-flowing flavoring powder having a flavor concentration substantially higher than that of heretofore conventional sugar-base flavoring powders, and including a dry free-flowing micro-crystalline cellulose on the particles of which a concentrated flavoring liquid has been dried in situ.

The present invention relates to a method of making free-flowing flavoring powders of high flavor-concentration, and the products of such method.

The object of the present invention is to produce stable free-flowing dry flavoring powders of high flavor-concentration and capable of being readily distributed in food products in a uniform manner for use in food-processing industries, such as the manufacture of ice-creams, the manufacture of bakery goods, the manufacture of cake-mixes packaged for home use, etc.

In the large-scale use of the various flavors and spices, particularly in the food processing industries aforementioned, the heretofore conventional forms of various flavorings and spices have been attended by a number of disadvantages.

This has been true both of natural and artificial flavoring materials, and has also been true of the various forms of each, such as the liquid extracts thereof, the powdered forms thereof, and other forms thereof.

In some instances the flavoring materials and spices, particularly those which are obtained from plant life in a natural form, such as, nutmeg, vanilla, black pepper, lovage, etc., the original plant material (as for instance vanilla bean, seed of lovage, fenugreek seed are finely ground and added to the food to be flavored or spiced thereby.

In other instances these natural plant materials are extracted with an appropriate solvent, and then the resultant solvent-extract is concentrated (or the solvent entirely removed) by distillation, and a more or less dilute or concentrated liquid-extract is thereby obtained; or upon further concentration an oleo resin is obtained which is or contains the extractive flavoring material of the plant.

In other instances a powdered flavoring material is made of these extracts, by mixing them with other materials such as sugar, starch, etc., as illustrated (by way of example) by paragraph 22.8 of Part 22 of Title 21 of the Code of Federal Regulations relating to vanilla powder obtained from vanilla extract.

Each of these various forms of flavoring materials or spice materials is attended by some disadvantage, and the industries using these flavoring materials are divided as to their preference for one form or another form thereof, according to the particular application and according to the individual's personal estimate as to which disadvantage is the least or most readily acceptable or viable.

Thus, for instance, flavor extracts or spice extracts in liquid form can generally not be made sufficiently concentrated or are not of as high a flavor-concentration or spice-concentration as is desirable in the industry. If, on the other hand, the liquid extract is further concentrated to obtain the oleo resin of the flavoring material, then it is found that such oleo resin is difficult to handle in its actual application. The heretofore conventional flavor-extract powders have likewise not been of the desired high flavor-concentration.

The heretofore conventional sugar-vanilla powder is recognized in part (1) of Section 22.8 (a) of Part 22 of Title 21 of the Code of Federal Regulations and is exemplified in U.S. Pat. 2,404,763 (wherein dry powderous rice-dextrin or the like is admixed with the previously prepared dry powderous vanilla-sugar to prevent the latter from becoming lumpy).

If in an effort to obtain a sugar-base flavoring material of higher flavor-concentration, the extractive flavoring material (as for instance vanilla extract) is concentrated beyond its flowable liquid state, then such concentrate becomes gummy and not effectively mixable with sugar, and any admixture of such concentrate with sugar will not dry to a friable and pulverizable state.

If in an effort to obtain a sugar-base flavoring material of higher flavor-concentration, a still adequately flowable concentrated liquid vanilla extract is mixed with sugar in a great enough proportion (in relation to the amount of sugar) to correspond to the higher flavor concentration, then such sugar+vanilla extract mixture will likewise not dry to a friable and pulverizable state.

The object of the present invention is to provide free-flowing flavoring powders or spice powders obtained from natural flavor extracts or artificial flavoring materials, and which have the higher flavor-concentration than that of heretofore conventional flavor-powders (as for instance vanilla-sugar powders), and which will be stable and will be capable of effective distribution through the mass of the food product to be flavored thereby.

Our invention comprises (among other things) so combining concentrated flavoring materials in liquid form with a free-flowing micro-crystalline cellulose powder to take up the concentrated flavoring liquid in large quantities compared to the amount of the micro-crystalline cellulose used, as ultimately to result in a free-flowing dry flavoring powder of heretofore unobtainable high flavor-concentration level and devoid of the disadvantages of any of the previously used conventional forms of flavoring materials. Such micro-crystalline cellulose powders are exemplified, inter alia, in an article entitled "Hydrolysis and Crystallization of Cellulose" appearing on pages 502–507 of the (1950) volume 42 of Industrial & Engineering Chemistry, and in U.S. Pat. 2,978,446, and as further and more specifically exemplified by the micro-crystalline cellulose powder marketed by the American Viscose division of the FMC Corporation under the trademark "Avicel."

According to our invention the natural-flavoring plant-material is first extracted by an appropriate solvent, according to conventional flavor-extracting or spice-extracting methods. The initial extract so obtained is then concentrated by conventional concentrating methods, to remove most or all of the solvent, thereby to obtain a more or less concentrated or viscous liquid which is or contains the oleo resin of the particular plant material, and which oleo resin is or contains the extractive flavoring substances.

Thereafter, according to our invention, we mix this concentrated flavor-liquid with sufficient of a free-flowing micro-crystalline cellulose powder or of a mixture of micro-crystalline cellulose and sugar, to form a heavy or thick dough-like paste.

This dough-like paste is then spread out into layers of a thickness suitable for drying, preferably in trays or pans, and is then air-dried by passing large volumes of heated air thereover until the previously dough-like paste becomes a dry friable solid cake.

This dry solid cake is then ground up or pulverized to a powder of suitable fineness.

In making certain flavoring-powders according to the present invention, we may also include comminuted dry sugar and/or starch along with the micro-crystalline cellulose, in place of a portion thereof. Thus, for instance, in in the case of vanilla powder according to our invention we may replace 50% to 85% (more or less) of the micro-crystalline cellulose with a corresponding amount of dry comminuted sugar or with a mixture of sugar and starch—to be mixed with the micro-crystalline cellulose prior to the intermixing of powder with the liquid flavor material.

The resultant flavor-powder may be used as obtained from the aforementioned grinding or pulverization operation or it may have a small percentage of a suitable dry powdered desiccant mixed therewith, as for instance, aluminum calcium silicate, calcium silicate, calcium stearate, magnesium silicate, tricalcium phosphate.

In addition to the oleo resin obtained by extracting natural flavoring plant materials and concentrating the extract, we may also use artificial flavoring compounds in liquid form in the method of our invention—intermixing the latter with the aforementioned powders and drying the resultant dough and thereafter pulverizing the dried material.

EXAMPLE 1

To make sugar-base vanilla-powder of 4-fold strength or flavor-concentration we mix 6.8 pounds of powdered or finely granulated sugar with 1.2 pounds of a dry free-flowing micro-crystalline cellulose powder.

The initial alcoholic extract of the vanilla-bean is relatively dilute, as, for instance, one gallon of the initial alcoholic extract containing the extractive flavoring constituents from 32 ounces of vanilla-bean.

This dilute extract is then concentrated, preferably by vacuum distillation, until 832 cubic centimeters of the resultant concentrate contain the extractive flavoring constituents from 53.4 ounces of vanilla-bean having a moisture content of not more than 25%. By this concentration all of the alcoholic content of initial dilute extract is distilled off, and a considerable portion of the water content thereof is likewise removed.

Eight hundred thirty-two (832) cubic centimeters of this concentrate are then thoroughly mixed into the aforementioned sugar-and-cellulose admixture until a dough-like paste is obtained in which the concentrated vanilla extract is uniformly distributed.

This paste is then put into shallow pans and dried in a current of heated air passing thereover for about eight hours, more or less, or until a friable and pulverizable mass is obtained.

The resultant friable and pulverizable mass is then crushed and finally powdered in a comminuting hammer mill to a fineness of approximately 60 mesh, more or less.

The resultant product is a free-flowing dry powder of 4-fold flavor concentration or strength. This is a flavor-concentration twice as great as that obtainable in heretofore conventional sugar-base vanilla powders.

EXAMPLE 2

The following is to produce an 8-fold dry free-flowing sugar-base vanilla-vanillin powder.

We thoroughly mix into an admixture of 6.8 pounds of sugar and 1.2 pounds of a free-flowing dry micro-crystalline cellulose powder, the concentrated extractive flavoring constituents from 53.4 ounces of vanilla bean having a moisture content of not more than 25% (mentioned in Example 1) and 4 ounces of vanillin (U.S.P.) in 4 ounces of 95% alcohol, until a dough-like paste is obtained in which the aforementioned flavoring materials are uniformly distributed. This dough-like paste is then dried to a friable and pulverizable mass as mentioned in Example 1 and is then crushed and pulverized as also stated in Example 1.

We may also make flavoring powders, as, for instance, vanilla powders, without sugar or starch, as in the following Examples 3 and 4.

EXAMPLE 3

To make a vanilla powder of 4-fold strength or flavor-concentration, we thoroughly mix into 8 pounds of a dry free-flowing micro-crystalline cellulose powder, the suitably concentrated extractive flavoring constituents from 53.4 ounces of vanilla-bean having a moisture content of not more than 25%, until a dough-like paste is obtained in which such extractive flavoring constituents are uniformly distributed. We thereafter dry this paste to a friable and pulverizable state and thereafter pulverize it.

EXAMPLE 4

To make a vanilla powder of 10-fold strength or flavor-concentration, we thoroughly mix into 8 pounds of dry free-flowing micro-crystalline cellulose powder, the suitably concentrated extractive flavoring constituents from 133.3 ounces of vanilla-bean having a moisture content of not more than 25%, until a dough-like paste is obtained in which such extractive flavoring constituents are uniformly distributed. We then dry the resultant paste to a friable and pulverizable state, and thereafter pulverize it.

If the vanilla bean in any of the foregoing examples has a moisture content greater than 25%, then the weight of the vanilla-bean stated in the example is proportionately increased, so that the amount of the extractive flavoring constituents obtained therefrom will be the same as would be obtained with the stated weight of vanilla-bean having a 25% moisture content.

In each of the foregoing examples the extractive flavoring constituents of the vanilla-bean are preferably concentrated to the liquid oleoresin state, although a lesser concentration can also be used.

To the dry free-flowing powder obtained by any of the foregoing examples, we may add 2% (or less) of a desiccant such as aluminum calcium silicate, calcium stearate, magnesium silicate and tricalcium phosphate.

Having disclosed our invention, we claim the following:

1. The method of making a dry free-flowing vanilla powder having a flavor-concentration of the general order of 4-fold, which comprises intermixing sugar and a dry free-flowing micro-crystalline cellulose and a concentrated vanilla extract, in the proportions of the general order represented by approximately 6.8 pounds of sugar, 1.2 pounds of micro-crystalline cellulose and the extractive flavoring constituents from approximately 53.4 ounces of vanilla-bean having a moisture content of approximately 25%, thereafter drying such mixture until the resultant product is friable and pulverizable and thereafter crushing and pulverizing the resultant mass.

2. The method of making a dry free-flowing vanilla-vanillin powder having a flavor concentration of the general order of 8-fold, comprising intermixing sugar and a free-flowing microcrystalline cellulose and a concentrated vanilla extract and vanillin in the proportion of the general order represented by approximately 6.8 pounds of sugar, approximately 1.2 pounds of microcrystalline cellulose, the extractive flavoring constituents from approximately 53.4 ounces of vanilla bean having a moisture content of approximately 25%, and approximately 4 ounces of vanillin (U.S.P.), in an alcoholic medium, and thereafter drying such mixture until the resultant product is friable and pulverizable, and thereafter crushing and pulverizing the resultant mass.

3. A dry free-flowing vanilla powder having a flavor concentration of the general order of 4-fold, including sugar and a free-flowing micro-crystalline cellulose and concentrated vanilla extract, in the proportion of the general order represented by approximately 6.8 pounds of sugar, approximately 1.2 pounds of micro-crystalline cellulose, and the extractive flavoring constituent from approximately 53.4 ounces of vanilla bean, having a moisture content of approximately 25%, in which vanilla powder the vanilla extract is dried in situ on the particles of the micro-crystalline cellulose.

4. A dry free-flowing vanilla-vanillin powder of approximately 8-fold concentration, including sugar and a free-flowing micro-crystalline cellulose and vanilla extract and vanillin, in the proportion of the general order represented by approximately 6.8 pounds of sugar, more or less, approximately 1.2 pounds of micro-crystalline cellulose, more or less, the extractive flavoring constituents from approximately 53.4 ounces of vanilla bean, more or less, having a moisture content of approximately 25%, and approximately 4 ounces of vanillin (U.S.P.), in an alcoholic medium, and in which the aforementioned flavoring materials are dried in situ on the particles of the micro-crystalline cellulose.

References Cited

UNITED STATES PATENTS

| | | | |
|---|---|---|---|
| 2,404,763 | 7/1946 | Gaver | 99—140 |
| 2,925,344 | 2/1960 | Peat | 99—140 |
| 3,023,104 | 2/1962 | Battista | 99—1 |

MORRIS O. WOLK, Primary Examiner

W. BOVEE, Assistant Examiner

U.S. Cl. X.R.

99—22